United States Patent
Blair et al.

(10) Patent No.: US 8,799,127 B1
(45) Date of Patent: *Aug. 5, 2014

(54) LOAN PAYOFF CALCULATOR SYSTEM AND METHOD

(75) Inventors: Theodore T. Blair, Herndon, VA (US); Tracy W. Dunsdon, Ellicott City, MD (US); Douglas G. Higgs, Bowie, MD (US); Rajaram Prasannan, Sterling, VA (US); Craig M. Rivers, Mitchellville, MD (US)

(73) Assignee: Fannie Mae, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/620,524

(22) Filed: Sep. 14, 2012

Related U.S. Application Data (63) Continuation of application No. 12/062,800, filed on Apr. 4, 2008.

(60) Provisional application No. 60/922,050, filed on Apr. 5, 2007.

(51) Int. Cl.
  *G06Q 40/00* (2012.01)
  *G06Q 40/02* (2012.01)

(52) U.S. Cl.
  CPC .............. *G06Q 40/025* (2013.01); *G06Q 40/02* (2013.01)
  USPC .............................................. 705/35; 705/38

(58) Field of Classification Search
  CPC .............................. G06Q 40/025; G06Q 40/02
  USPC ..................................................... 705/35, 38
  See application file for complete search history.

(56) References Cited

U.S. PATENT DOCUMENTS

| | | |
|---|---|---|
| 5,577,188 A | 11/1996 | Zhu |
| 7,103,517 B2 | 9/2006 | Gluhovsky et al. |
| 7,574,400 B1 | 8/2009 | Stokum et al. |
| 7,577,601 B1 | 8/2009 | Rademacher et al. |
| 7,620,594 B1 * | 11/2009 | Davis et al. ...................... 705/38 |
| 8,301,558 B2 * | 10/2012 | Marshall et al. ................. 705/39 |
| 2002/0152155 A1 | 10/2002 | Greenwood et al. |
| 2003/0236725 A1 | 12/2003 | Hickox et al. |
| 2004/0010419 A1 * | 1/2004 | Sinnott ............................ 705/2 |
| 2005/0177389 A1 | 8/2005 | Rakowicz et al. |

OTHER PUBLICATIONS

C. Pass et al., Collins Dictionary of Business, 2005, Collins, Discounted cash flow.*
Jack Guttentag, www.mtgprofessor.com, Nov. 29, 2006, Jack Guttentag, Mortgage Prepayment Penalty.*
Final Office Action on U.S. Appl. No. 12/062,800, mail date Aug. 28, 2013, 27 pages.

(Continued)

*Primary Examiner* — Kirsten Apple
*Assistant Examiner* — Scott S Trotter
(74) *Attorney, Agent, or Firm* — Foley & Lardner LLP (57) ABSTRACT

A data processing system for analyzing and reporting payoff quotes for mortgage loans is provided. The system provides several user interfaces: e.g., an interface through which lenders may enter lender payment information, an interface through which an analyst may enter payment quotes, and an interface through which lenders and/or analysts may compare the other prepayment information with prepayment payment quotes provided by the system. Any of the interfaces may be supported via a network. A database of all payoff quotes, lender payment information and any lender decisions regarding the same is maintained by the system for future reference.

20 Claims, 7 Drawing Sheets

(56) References Cited

OTHER PUBLICATIONS

Non-Final Office Action on U.S. Appl. No. 12/062,800, mail date Mar. 28, 2013, 24 pages.
Office Action on U.S. Appl. No. 12/062,800, mail date Jun. 10, 2010, 20 pages.
Office Action on U.S. Appl. No. 12/062,800, mail date Nov. 24, 2010, 26 pages.
Winnett, Robert, "10 steps to avoid the mortgage trap", Oct. 25, 1998, Sunday Times, Iss. 9087, 3 pages.
Non-Final Office Action on U.S. Appl. No. 12/062,800, mail date Apr. 22, 2014, 30 pages.

* cited by examiner

Loan Number:
Loan Still in Prepayment Lockout Period?:
Note Date:
Expected LPI Date:
Expected Payoff Date:

UPB at Payoff:

LOAN PAYOFF CALCULATOR SYSTEM AND METHOD

CROSS-REFERENCE TO RELATED APPLICATIONS

This application is a continuation of co-pending U.S. application Ser. No. 12/062,800, entitled "Loan Payoff Calculator System and Method" filed on Apr. 4, 2008, which claims the benefit of U.S. Prov. Ser. No. 60/922,050, entitled "Loan Payoff Calculator System and Method," filed Apr. 5, 2007, hereby incorporated by reference in their entirety.

BACKGROUND

Borrowers often take out loans to finance significant purchases, such as purchases of property. Such loans are then paid off over a period of time according to a predetermined payment schedule. Sometimes, a borrower may wish to pay off a loan early ("prepayment"). Often times, determining the amount that is to be paid when prepayment occurs is a time-consuming and error-prone process. In addition to the unpaid principal balance, any unpaid interest, and any other processing fees or charges, many loans include prepayment premiums that are to be paid upon early satisfaction of the loan. Prepayment premiums ensure that the lender receives the expected interest payments for the loan or some otherwise satisfactory compensation.

The manner in which the payoff amount (including the prepayment premium) is to be calculated is typically specified in the loan agreement between the borrower and lender. There are various ways that loan agreements typically specify for calculating prepayment premiums. One conventional method, known as "declining premium," specifies premiums to be paid which decline as the loan reaches maturity. Another conventional method, known as "yield maintenance," allows the lender to attain the same yield as if the borrower had made all scheduled mortgage payments until maturity. Yield maintenance prepayment premiums typically are designed to make lenders indifferent to an early prepayment by a borrower. To this end, the yield maintenance payoff amount is typically calculated based on a reference interest rate (e.g., US treasury rate). The prepayment premium may be equal to the present value of unpaid principal and interest payments. There are a number of factors that may significantly influence payoff calculations and administration, e.g., the date from which the prepayment premium is calculated, the reason for early satisfaction of the loan, the interest rate on the loan, etc.

In addition, once a loan is paid off, there are often times multiple parties that receive a portion of the funds received from the borrower. For example, the lender or other servicer typically receives a portion of the payoff amount from the borrower. Additionally, many loans are often resold or repackaged in secondary markets. For example, in the mortgage finance industry, multi-family homes may serve as collateral for loans which are subsequently pooled and used to create an MBS (mortgage-backed security). The MBS is an investment instrument that can be sold to investors in the global capital markets. Upon sale of the MBS, lenders can turn around and make new loans using proceeds from the sale. In effect, the MBS is a way for the global capital markets to provide capital for loans to fund home ownership. When a loan is pooled into an MBS, the investor in the MBS is among the parties that receives a portion of the payoff funds received from the borrower.

The time-consuming and tedious nature of calculating payoff amounts is made worse by the fact that these amounts may be calculated multiple times throughout the life of a loan. In addition to calculating the payoff amount and the prepayment premium when the borrower actually pays off the loan, it is often desirable to calculate these amounts at other times. For example, in some instances, a borrower may be contemplating paying off the loan early, and may request a quote so that the borrower knows what the payoff amount would be, i.e., should the borrower decide to actually pay off the loan. Ultimately, however, the borrower may decide not to pay off the loan at that time. Accordingly, interested parties may request information regarding payoff amounts and prepayment premiums multiple times during the life of the loan.

Therefore, there is a need to provide a system that makes payoff quoting and reporting more convenient. Additionally, there is a need for a system which provides easier access to information regarding payoff amounts. It should also be understood that the techniques described herein may also be applied to meet other needs instead of or in addition to the above needs. For example, although the systems and methods discussed herein are described in terms of home mortgages, it will be apparent that the systems and methods may be used in connection with other types of assets, loans and/or other investments.

SUMMARY

An exemplary embodiment relates to a data processing system for generating loan payoff information, that includes: payoff calculation logic configured to accept loan information and generate a payoff quote for a loan. The payoff quotes include: (i) a prepayment premium for premature satisfaction of a loan; and (ii) a total payoff amount for the premature satisfaction of the loan. User interface logic is configured to communicate the payoff quote via a network.

BRIEF DESCRIPTION OF THE DRAWINGS

The exemplary embodiments will hereafter be described with reference to the accompanying drawings, wherein like numerals denote like elements.

DETAILED DESCRIPTION

Figure 1:
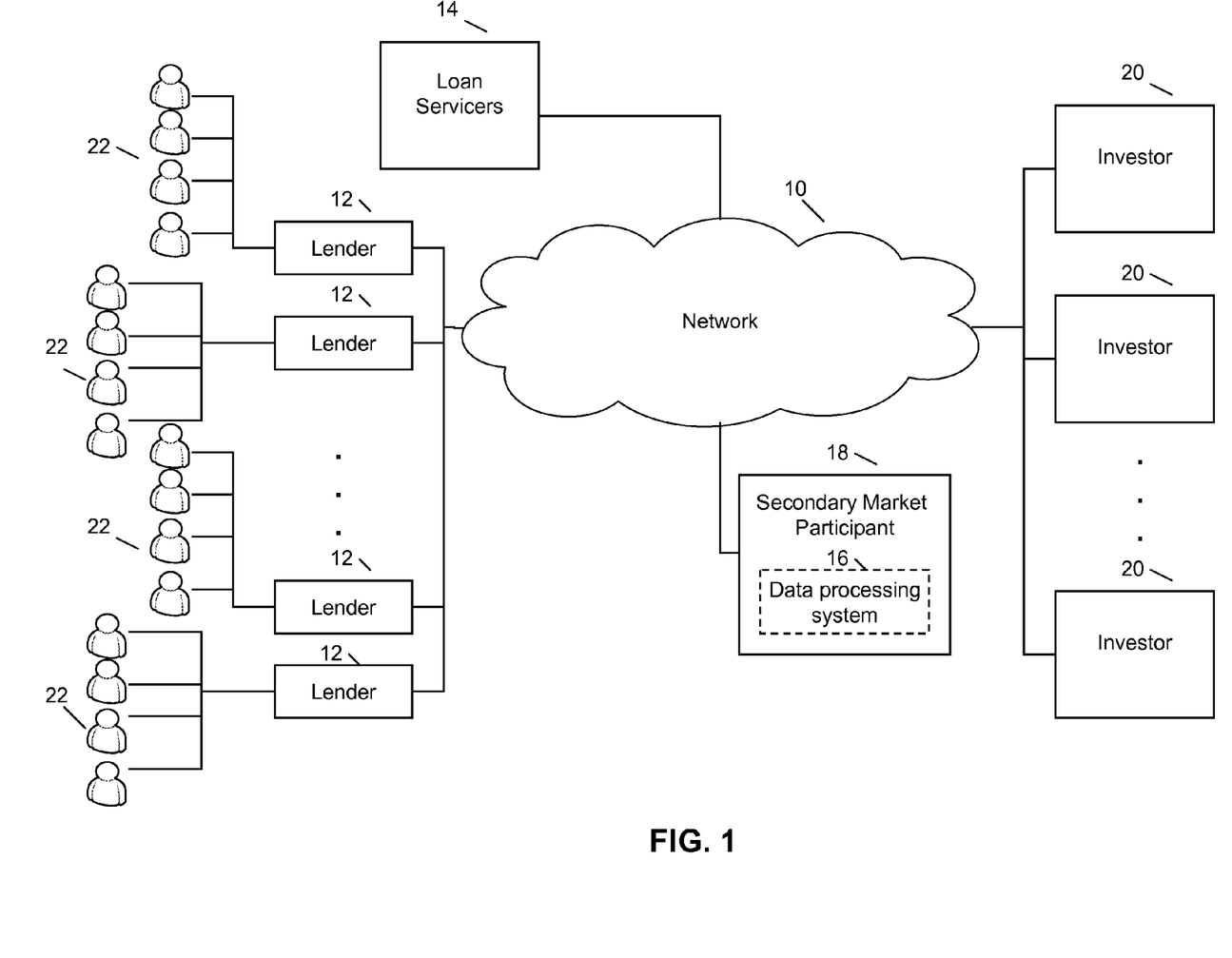
FIG. 1 is a schematic illustration of system users in accordance with an exemplary embodiment.

Referring now to FIG. 1, a data processing system 16 is shown for generating payoff quotes including total payoff amounts for loans that may be prematurely satisfied. The system 16 utilizes a network 10 enabling communication between any number of different entities or system users (e.g., lenders 12, loan servicers 14, secondary mortgage market participants (e.g., purchaser) 18, and investors 20). The data processing system 16 may be configured to receive requests for payoff quotes (including payoff amounts and prepayment premiums), to generate the payoff quotes, to apportion the payoff amounts between various parties, and to communicate the relevant information to the relevant parties.

The lenders 12 makes loans to borrowers 22 to finance the purchase of properties. Herein, it is assumed for purposes of providing an example that the data processing system 16 is used in the context of loans for multi-family properties. In exchange for cash to purchase the home, the borrower 22 and lender 12 enter into a loan agreement. The terms of the loan agreement set forth the method of calculating any prepayment premiums and the total payoff amount for the loan if the loan is satisfied prematurely. Lenders 12 may have a variety of different mortgage products that are made available to various borrowers. Such loan products may have different payment terms (e.g., regarding frequency of payments, prepayment premiums, miscellaneous fees and total payoff amounts) set forth in the loan agreement.

The loan servicers 14 accept payments for each loan. In some cases, the lender 12 may perform both loan origination and the loan servicing itself, in which case the lender 12 and the loan servicer 14 for a given loan are the same entity. In other cases, the lender 12 may originate the loan, but then outsource servicing or sell servicing rights to servicer 14, in which case the lender 12 and the loan servicer 14 are separate entities.

The secondary mortgage market participant (e.g., purchaser) 18 purchases the loan or performs other services in connection with the loan, for example, guaranteeing the timely payment of principal and interest. The data processing system 16 is preferably usable to support various types of transactions which may be executed by the secondary mortgage market participant 18 in connection with one or more loans. For example, the participant 18 may purchase loans from lenders or other loan originators as part of a cash execution. For example, the lender 12 may sell loans to purchaser 18 for cash, and the purchaser 18 may pool the loans with other loans and issue MBS to investors 20. Alternatively, the purchased loans may also, for example, be held as investments in the purchaser's investment portfolio. Alternatively, the purchaser 18 may create mortgage backed securities (MBS) as part of an MBS execution, or create other financial instruments or assets that are backed by cash flows associated with individual loans. In this case, the MBS may be sold to investors 20 by the lender 12 in exchange for cash funds enabling lenders 12 to provide additional home loans to an increased number of borrowers 22. The participant 18 may also use loans to create other types of financial assets or instruments, or may perform other services, such as guaranteeing the timely payment of principal and interest in exchange for a fee. Herein, for purposes of providing an example, it is assumed that the secondary mortgage market participant 18 (hereinafter, "purchaser 18") purchases the loans.

The data processing system may be maintained by one of the lenders 12, one of the servicers 14, the purchaser 18, or one of the investors 20. Herein, for purposes of providing an example, it is assumed that the data processing system 16 is maintained and operated by the purchaser 18. The data processing system 16 performs the accounting for each loan and may serve as the system of record for such loans. For every payment received from a borrower 22, the appropriate amounts are applied to the unpaid principal balance, interest owed, etc. Any over or under payments are documented and adjudicated by the loan servicer 14. Any defaults are reported to the purchaser 18 and/or other interested entities. Data processing system 16 also reports the performance of the MBS to investors 20, e.g., via the network 10. The financial performance of the MBS depends on the actual payments received or collected for each loan. In the case of a loan payoff, data processing system 16 may further be configured to calculate the payoff amount that is due (e.g., when early payoff is requested); to calculate the apportionment of the paid amounts between the lender 12, the servicer, 14, the purchaser 18, and/or the investors 18; and to provide information concerning these amounts to the relevant parties.

For example, during the life of a loan, a borrower that is considering paying off its loan early may request a payoff quote. The manner in which the data processing system 16 is accessed to generate the payoff quote may depend on which parties have direct access to the data processing system 16 to request such quotes. For example, if only the purchaser 18 has direct access to request payoff quotes, then the request for the payoff quote may be manually (e.g. telephonically) transmitted from the borrower 22 to the purchaser 18 (e.g., via the servicer 14), and an employee of the purchaser 18 may access the data processing system 16 to generate the payoff quote. In another embodiment, the lenders 12 and/or servicers 14 may be provided with direct access to request payoff quotes. In yet another embodiment, the borrowers 22 may also be provided with direct access to request payoff quotes.

As described in greater detail below, various user interface screens (e.g., web pages) may be provided to collect any needed information concerning the payoff quote request and to provide results to one or more users. In some embodiments, the payoff quote may be forwarded directly to the lenders 12, loan servicers 14, purchasers 18 and/or investors 20 via the network 10. In other embodiments, once the payoff quote is generated, it may be reviewed by a human analyst to confirm that it is correct. The human analyst may be an employee of the purchaser 18. In other embodiments, the human analyst may be an employee of the lender 12 or the loan servicer 14. Once the payoff quote is received by the lender 12 or loan servicer 14, another human analyst may review the quote based on data maintained by the lender/servicer. Such user may then acquiesce to the payoff projection and accompanying total payoff amount or reject it. For example, if the payoff quote is believed to be incorrect, various user interface screens may be provided which permit the lender 12 or the loan servicer 14 to submit requests to resolve data discrepancies that they believe they have detected while reviewing a payoff quote for a loan (e.g., a discrepancy in purchaser data for the loan as compared to lender data for the loan).

As will be appreciated, in some cases, based on the payoff amount, the borrower may decide not to pay off the loan, at least not at that time. In other cases, the borrower may decide to move forward with paying off the loan. Once a payoff quote is generated, the payoff quote and related data may be archived for subsequent retrieval and analysis, should such retrieval and analysis become necessary. For example, at a later date, a question may arise as to whether the payoff amount paid by the borrower was correct. Archiving the payoff quote and related historical data may create a suitable audit trail to permit users to know how the payoff quote was generated, who created/approved/deleted it, and so on, for review at a later time.

Figure 2:
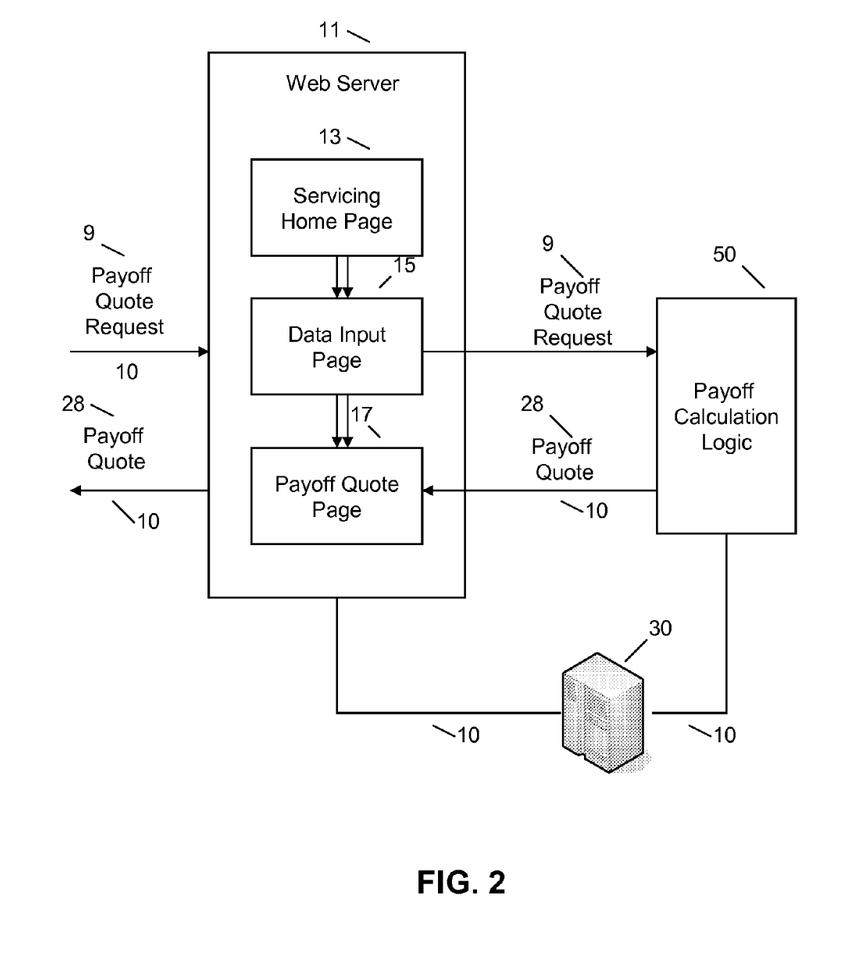
FIG. 2 is a schematic illustration of a data processing system with web interface system in accordance with an exemplary embodiment.

Referring now to FIG. 2, the payoff quote 28 may be obtained through a web interface system 11. The web interface system 11 may be accessible via the Internet (e.g., by the lenders 12, the servicers 14, the purchaser 18 and/or the borrowers 22, as indicated above). The web interface system 11 includes a web server 21 which generates various web pages including servicing home page 13, data input pages 15, and payoff quote page 17.

The servicing home page 13 may provide an access portal for data processing system 16 where servicing-related operations may be performed. For example, servicers 14 may access servicing home page 13 to submit monthly payment information, to reconcile loan data and current loan balances, and so on. The home page 13 may include an html link which is appropriately labeled to indicate payoff quote functionality and which delivers the user to the data input page (or pages) 15. The data input page 15 receives user and loan information from users to permit payoff quotes to be generated. (Examples of data input pages are provided with reference to FIGS. 4-5, described in greater detail below.) Each payoff quote depends on the loan agreement and payments received in accordance with the same. The loans for which payoff quotes are received may be any type of loan and are not necessarily the same kind nor do they necessarily have similar terms. After the appropriate information is received from the user, the payoff request and accompanying information is submitted to payoff calculation logic 50. Payoff calculation logic 50 generates payoff quote information which is then used by web server 21 to generate payoff quote page 17. The payoff quote page 17 includes the payoff quote and is communicated to the relevant party (e.g., lender 12, loan servicer 14, purchaser 18 and/or investor 20) via the network 10.

The payoff quote 28 may be generated based on data that is manually entered, data that is retrieved from electronic data sources, or a combination of both. In the illustrated embodiment of FIG. 2, the payoff quote 28 is generated based on a combination of data that is manually entered and data that is retrieved from electronic data sources. For example, although various user interface screens are described below for obtaining data needed for payoff calculations from users, it will be appreciated that any/all of this data may also be retrieved from automated data feeds, allowing payoff quotes to be generated in an entirely "lights out" manner. In this way, the total payoff amounts for any loan product is available at any time. Payoff quotes 28 are saved in a database 30 for future reference as needed, as previously indicated.

Figure 3:
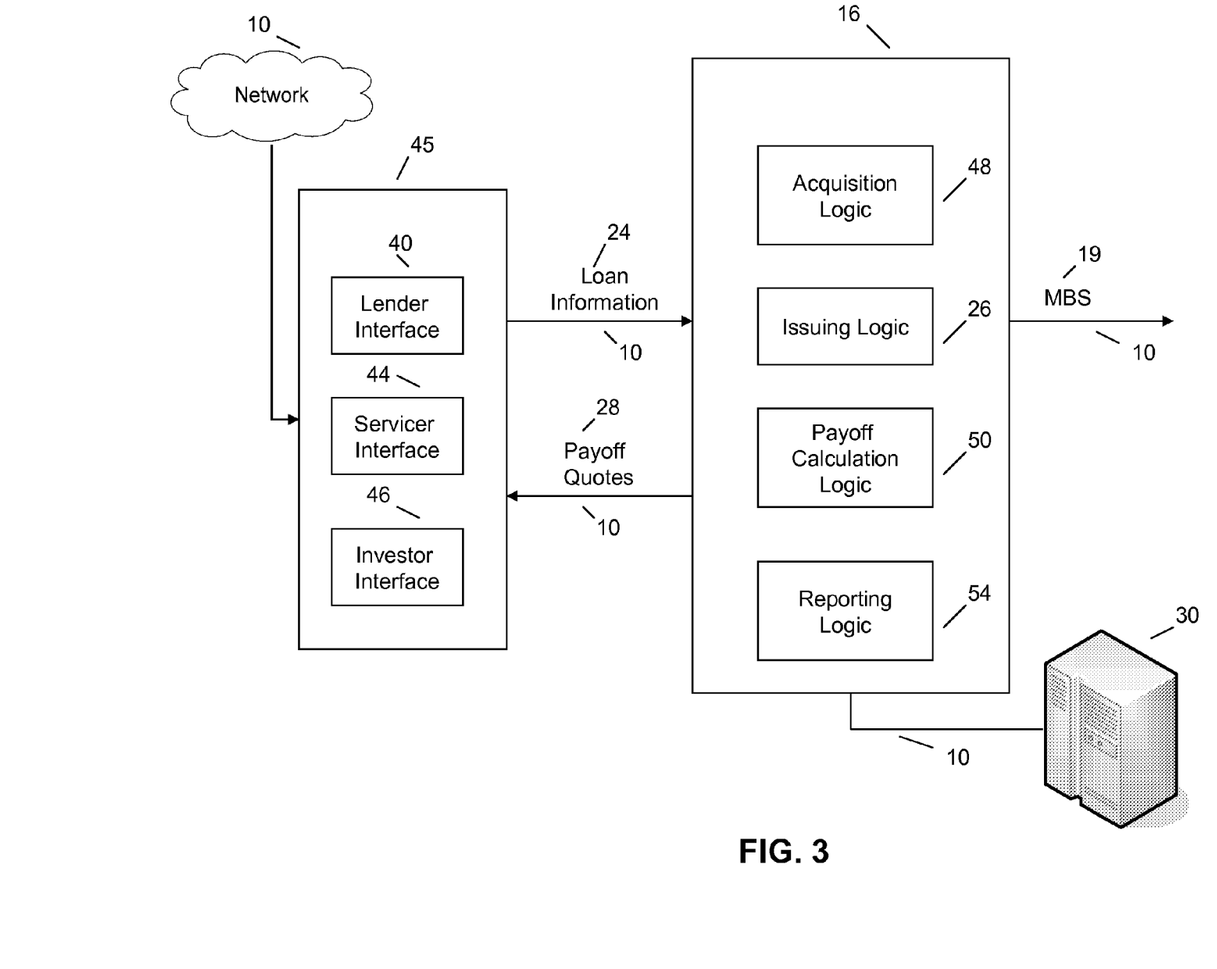
FIG. 3 is a schematic illustration of a data processing system in accordance with an exemplary embodiment.

Referring now to FIG. 3, data processing system 16 may perform the accounting for each loan and may serve as the system of record for such loans. As such, in addition to including the payoff calculation logic 50, the data processing system 16 may also include other logic for performing a variety of other operations in connection with loans. As shown in FIG. 3, data processing system 16 further includes acquisition logic 48, issuing logic 49, and reporting logic 54. The acquisition logic 48 receives loan information 24 from the lender 12, e.g., when each loan is purchased. The loan information 24 includes, loan type, loan term, interest rate, interest-rate type (e.g., fixed or adjustable), unpaid principal balance, payment arrangements (e.g., interest-only, loan amortization amount, any negative amortization amounts), servicing fees and so forth. Loan types may include, for example, fixed loans or adjustable rate mortgages.

Issuing logic 49 accepts loan information 24 for a number of loans and securitizes the loans for investment purposes. Issuing logic 49 is used to generate financial assets. Herein, the term "issuing logic" refers to any logic that is used to generate/create financial assets. The issuing logic 49 may be used to generate financial assets such as MBS, debt instruments, or any of the other types of financial instruments. The issuing logic 49 may also be used to generate financial assets that are tracked internally in situations where the owner/operator of the data processing system 16 purchases a pool of loans and holds the loans as an investment in its own portfolio.

Payoff calculation logic 50, as previously described, generates payoff quotes 28 which are communicated to lenders 12 and loan servicers 14 via a user interface 45 supported by the network 10. Payoff quotes 28 include calculations of prepayment premiums due for a prematurely satisfied loan. For each loan, the payoff quote may differ depending on the loan terms (including the specified method of calculating the prepayment premium), current unpaid principal balance, and so on.

Payoff calculation logic 50 includes different payoff calculation algorithms for calculating different types of prepayment premiums. The determination of which payoff calculation algorithm is to be used may be determined manually or automatically. For example, based on a review of the loan agreement, an analyst at purchaser 18 may specify the algorithm to be used through a selection on suitable user interface screen. As another example, if an identification of the algorithm to be used is stored as part of the loan data for the loan, then payoff calculation logic 50 may automatically determine which algorithm to use based on a loan identification number or other suitable identifier. Payoff calculation logic 50 uses loan information entered through user interface 45 and/or retrieved from other sources to generate the payoff quotes for the loans.

Data processing system 16 includes a database 30 which stores all purchaser payoff quotes 28 therein for archival purposes. Purchaser 18 may then retrieve information from database 30 to access archived payoff quotes. Each quote that is generated may be indexed and tracked, e.g., using a suitable identification number that is generated when the payoff quote is generated. As another example, payoff quotes may be stored according to a loan identification number, a document number, loan type or any other information. The database may include database and access control logic (not shown) which provides the user security administration and control for each database. The database access and control logic also maintains referential integrity, processes queries and updates, and performs tasks related to access and control of the payoff quotes. The database 30 may utilize any type of software and hardware platforms including various operating systems, web servers, application servers and hardware.

Reporting logic 54 cooperates with servicing home page 13 and related tools. As previously indicated, the servicing home page 13 may provide an access portal for data processing system 16 where servicing-related operations may be performed. For example, servicers 14 may access servicing home page 13 to submit monthly payment information, to reconcile loan data and current loan balances, and so on. When payoff quotes are generated, the payment data received through such operations is used by the payoff calculation logic 50 to generate the payoff quote.

Data processing system 16 also includes user interface logic 47 which may include program logic for providing a lender interface 40, servicer interface 44 and/or investor interface 46. Lender interface 40 is provided for transferring loan information 24 to the data processing system 16. Servicer interface 44 and investor interface 46 enable servicers 14 and investors 20, respectively, to correspond with data processing system 16 via the network 10. A purchaser interface (not shown) may also be included in the user interface 45 to enable purchaser 18 to access and control data processing system 16. User interface 45 may be any type of interface enabling communication between system users and the data processing system 16. For example, user interface 45 may be a website which is implemented by web server 21 and which is accessible over the Internet. Any type of software code or logic (i.e., user interface generation logic) may be utilized to generate the user interface 45 (e.g., html). As another example, user interface may be a telephonic interface enabling users to obtain information over the telephone.

Figure 4:
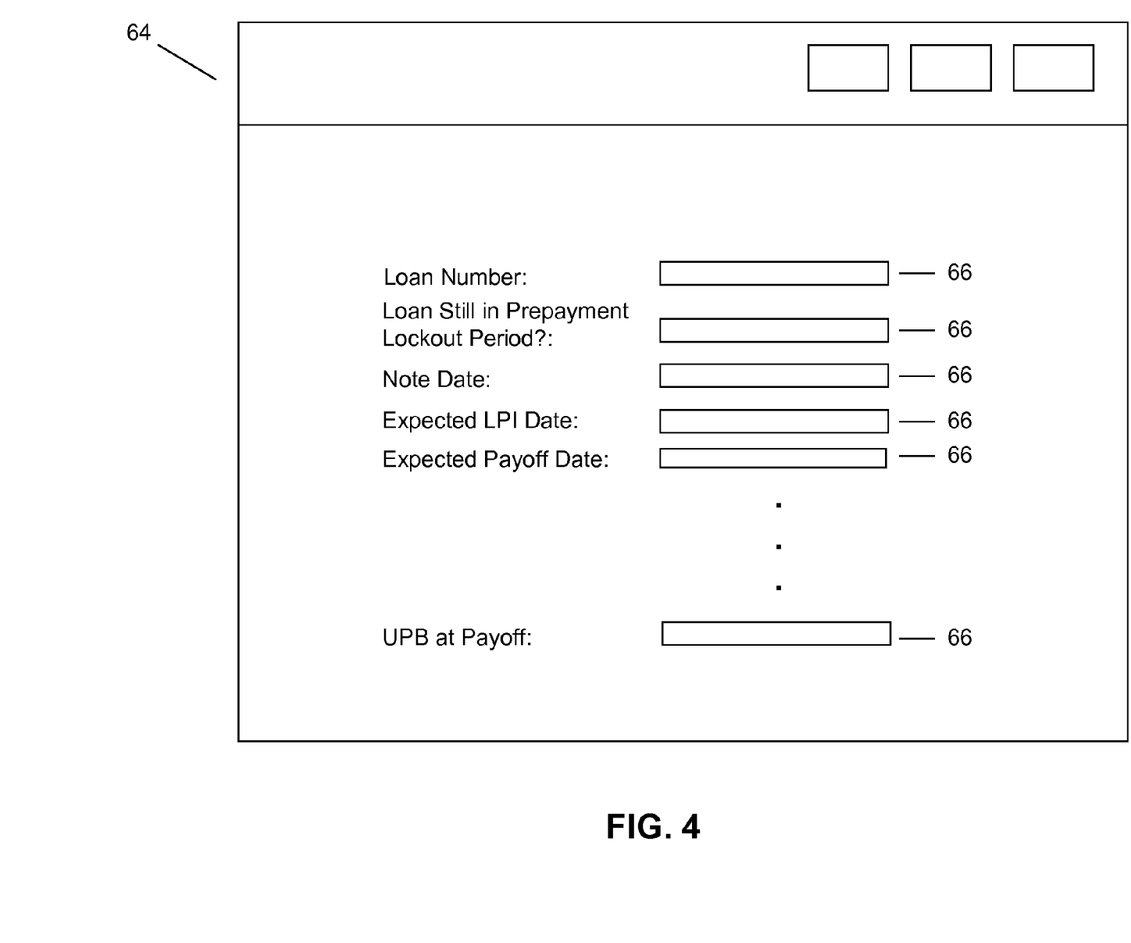
FIG. 4 is a user interface for entering loan information in accordance with an exemplary embodiment.

FIG. 4 shows a web page 64 generated by user interface logic 47. Web page 64 may be generated by any one of the interfaces included in the user interface logic 47 including, for example, the lender interface 40 and/or servicer interface 44. Web page 64 includes loan identification prompts 66, requesting loan information from the user. For example, such information may include the loan number for the loan. Based on the loan number, other information may also be retrieved for the loan. In an exemplary embodiment, such information includes information such as Servicer Name, Servicer Number, Servicer Loan ID, Property Name, Maturity Date, Interest Basis, Interest Rate, Current Interest Rate, Service Fee Rate, Pass Thru Interest Rate, Guarantee Fee Rate, Pool Number, Loan Type (e.g., fixed or ARM), Investment Type (e.g., cash or MBS), and so on.

The following table provides additional examples of common data elements that may be obtained from the user:

| Item # | Data Element | Applicable Loan Types/ Investment Types | Relationship/Additional Conditions/Notes |
|---|---|---|---|
| 1 | Is the Loan currently in Prepayment Lockout Period? - The user will select from the following: No Yes Waived | All | No is the default value. If the user selects Yes, the payoff quote generation will not continue. If the user selects Waived, a comment must be entered. |
| 2 | Prepayment Type - The user will select from the following: Yield Maintenance (YM) Declining Premium (DP) | All | If the user selects Yield Maintenance (YM), the YM End Date is entered. If the user selects Declining Premium (DP), the DP Percent is entered. |
| 3 | Note Date | All | Will be < Expected LPI Date |
| 4 | Expected LPI Date | All | Will be <= Expected Payoff Date. For ARM loans, will be <= the Current Interest Rate Effective Date. |
| 5 | Expected Payoff Date | All | For ARM loans, will be >= the Current Interest Rate Effective Date. |
| 6 | Liquidation Reason - The user will select from the following: Payoff Refinance with Purchaser Refinance not with Purchaser Conversion ARM to Fixed Maturity Repurchase Foreclosure REO Insurance Proceeds Partial Payoff Other | All | If the user selects Other, a comment is also entered. |
| 7 | Borrower Notification Date | All | None |
| 8 | Notification Criteria - The user will select from the following: At Least 60 Days Notice At Least 30 Days Notice At Least 30 Days Notice, But No More Than 60 Days Notice At Least 20 Days Notice, if Given Via Fax, Email or Overnight Courier, But No More Than 60 Days Notice. | All | None |
| 9 | UPB at Payoff | All | None |

The following table provides additional examples of other data elements that may be obtained from the user, depending on the type of loan:

| Item # | Data Element | Applicable Loan Types/ Investment Types | Relationship/Additional Conditions/Notes |
|---|---|---|---|
| 1 | Present Value Factor (PVF) The user will select from the following: $(1 - (1 + r)^{-n})/r$ $(1 - (1 + r)^{(-n/12)})/r$ | All | Only applies to Yield Maintenance (YM) loans that are within the YM Period. |

-continued

| Item # | Data Element | Applicable Loan Types/ Investment Types | Relationship/Additional Conditions/Notes |
|---|---|---|---|
| 2 | 1% Criteria - The user will select from the following: 90 Days Prior to Maturity 3 Months Prior to Maturity | All | Conditional on user selecting Prepayment Type "Yield Maintenance (YM)" and the loan is out of the YM period (Expected Payoff Date > YM End Date). |
| 3 | Wall Street Journal Countback Criteria - The user will select from the following: "25 Business Days Prior to Borrower's Intended Prepayment Date" "5 Business Days Prior to Borrower's Notification Date" | All | Conditional on user selecting Prepayment Type "Yield Maintenance (YM)" and the loan is in the YM period. |
| 4 | Wall Street Journal Date* | All | Conditional on user selecting Prepayment Type "Yield Maintenance (YM)" and the loan is in the YM period. Derived from the user's selection of the 'WSJ Countback Criteria', and the 'Expected Payoff Date' or the 'Borrower Notification Date' entered by the user. |
| 5 | Wall Street Journal Yield Rate | All | Conditional on user selecting Prepayment Type "Yield Maintenance (YM)" and the loan is in the YM period. Conditional on the Wall Street Journal Date derived. |
| 6 | Base Treasury Date | All | Conditional on user selecting Prepayment Type "Yield Maintenance (YM)" and the loan is in the YM period. |
| 7 | Treasury Rate | All | Conditional on user selecting Prepayment Type "Yield Maintenance (YM)" and the loan is in the YM period. |
| 8 | ARM Current Interest Rate Effective Date | ARM | Used for ARM interest calculations. |
| 9 | ARM Validated Current Interest Rate | ARM | Used for ARM interest calculations. This field will be initially set to the eServicing Interest Rate, but it can be edited by the user. |
| 10 | ARM Rate Change Frequency | ARM | Used for ARM interest calculations. |
| 11 | ARM Next Interest Rate | ARM | Used for ARM interest calculations. |
| 12 | Declining Premium Split Method - The user will select from the following: No split to lender Notional Guarantee Fee Rate Amounts | Cash | Conditional on user selecting Prepayment Type 'Declining Premium (DP)'. If Notional Guarantee Fee Rate is selected, a text field will be activated to accept input of the rate. If Amounts is selected, multiple text fields will be activated to accept input of dollar amounts for: Fannie Mae, Lender, and Investor (MBS only). The sum of the entered amounts must equal the Total Declining Premium Amount displayed on the screen. |
| 13 | Premium Only Due Fannie Mae - The user will select from the following: Yes No | Non-DUS | Conditional on user selecting Prepayment Type "Yield Maintenance (YM)" for a Non-DUS Cash loan. |
| 14 | Analyst 2 Name | All | Does not appear when Payoff Quote is generated. Displayed when state changes to "Approved". |

-continued

| Item # | Data Element | Applicable Loan Types/ Investment Types | Relationship/Additional Conditions/Notes |
|---|---|---|---|
| 15 | Commit Number (Optional Entry) | DUS | User selects Liquidation Reason of 'Refinance with Fannie Mae' Only. |
| 16 | Interest Amount Calculation Method - The user will select from the following: Collect Full Month of Interest Collect Interest up to the Expected Payoff Date | Cash | None |
| 17 | Comments | All | The user will enter miscellaneous notes in this area. Comments previously entered are stored in a protected area and can be viewed by clicking on a Comments Log link. |

The following table provides additional examples of other data elements that may be obtained from the user, if a waiver or Miscellaneous Fee is required:

| Item # | Data Element | Applicable Loan Types/ Investment Types | Relationship/Additional Conditions/Notes |
|---|---|---|---|
| 1 | Miscellaneous Fee Type - The user will select from the following: Default Interest Shortage/Surplus Additional Prepayment Premium Release Fee Termination Fee Other (with Description) | All | For Other, the user will enter a description of the Miscellaneous Fee. |
| 2 | Fee Applies To - The user will select from the following: Fannie Mae Lender Investor | All | A Fee Applies To selection will be associated with each selected Fee Type. The Investor selection will apply only to MBS loans. |
| 3 | Miscellaneous Fee Amount | All | A fee amount will be associated with each selected Fee Type. These amounts will be added or subtracted to the quote total. |
| 4 | 1% Refinance Waiver - The user will select from the following: Yes No | DUS | Conditional on the calculator determining if the loan is in the 1% period and the Liquidation Reason selected by user is 'Refinance with Fannie Mae' and the loan is Cash, or the loan is MBS and the Note Date <= Apr. 1, 1999. If 'Yes' is selected: For YM, the 1% of UPB will not be calculated. |

Figure 5:
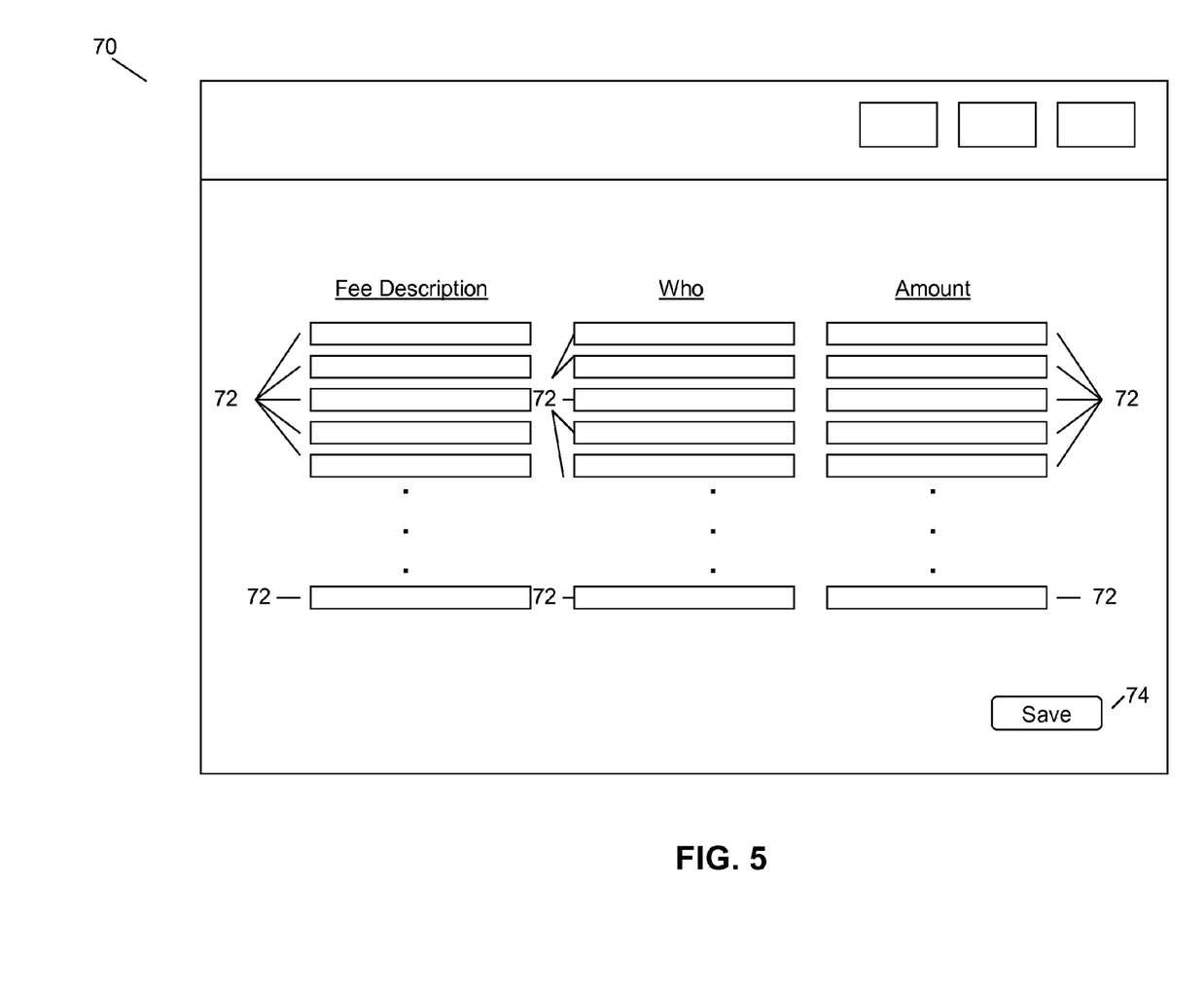
FIG. 5 is a user interface for entering loan information in accordance with an exemplary embodiment.

Referring to FIG. 5, user interface 70 is provided for entering loan information, particularly with regards to miscellaneous fees, for a number of loans, as shown in FIG. 5. The interface 70 includes a series of prompts 72 for entering fee type descriptions for a number of loans. Prompts 72 include pull-down menus for selecting from a number of different choices regarding the types of fees to be considered in determining the loan payoff amount. The amount of the fees as well as the entity to which the fee is payable may also be entered by the user through prompts 72. This information is then included in the calculation of the purchaser prepayment premium and total pay off amounts for each loan. This information may be saved for later retrieval by activating the "Save" link 74. In one embodiment, the payoff calculation logic 50 includes logic configured to access data listings with projects accounting for miscellaneous fees and waivers in the calculation of the total pay off amount. For example, the borrower 22 may be obligated to provide any number of the following upon loan satisfaction: default interest, shortage or surplus fees, an additional prepayment premium, release fee, termination fee, etc. The user interface 70 includes a prompt 72 for the user to select any of the fees which may apply. Anyone of the system entities may receive payment of additional fees. The loan agreement may entitle the borrower to a refinance waiver. The waiver would exempt a set amount of the unpaid principal balance in the calculation of yield maintenance interest owed on the loan. For example, on a loan with a 1% refinance waiver, 1% of the unpaid principal balance of the loan will not be used in the calculation of the yield maintenance interest rate.

Figure 6:
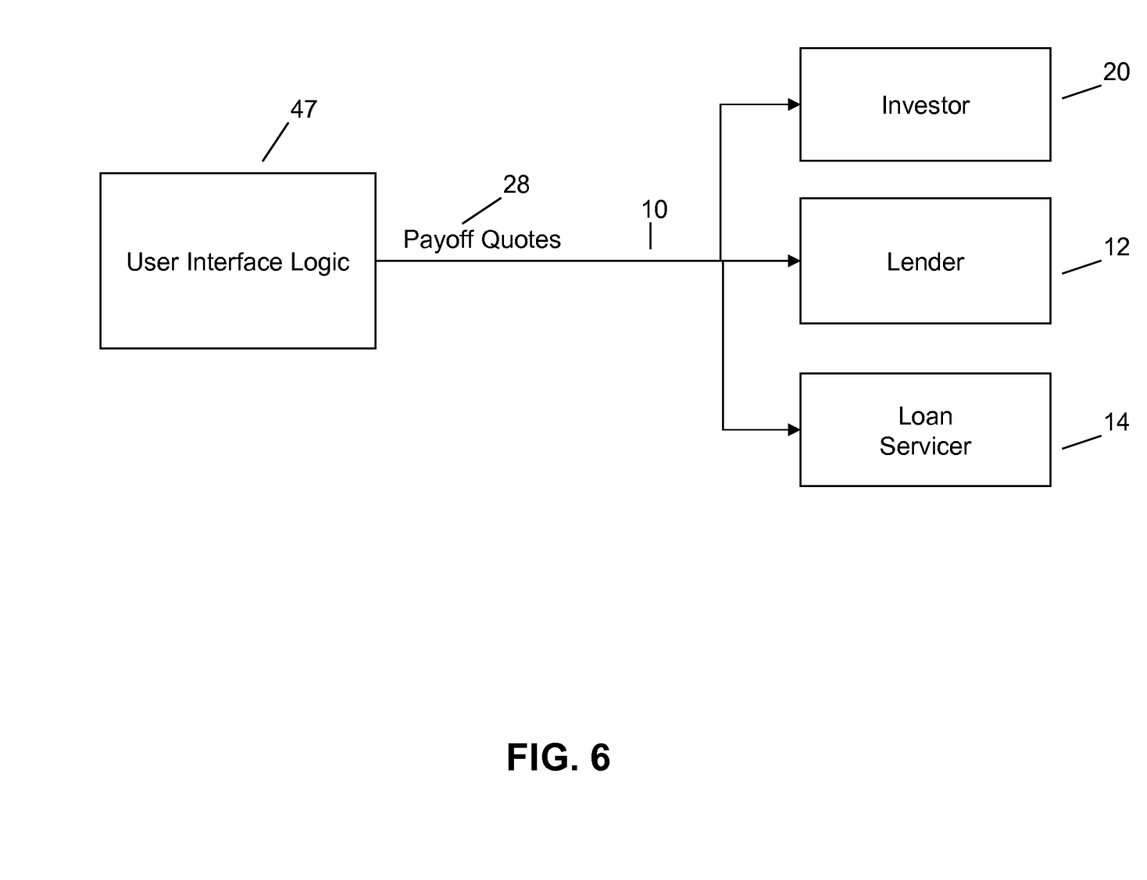
FIG. 6 is a schematic illustration of reporting logic in accordance with an exemplary embodiment.

Referring now to FIG. 6, user interface logic 47 reports purchaser payoff quotes 28 to system users. Furthermore, user interface logic 47 may include details on the loan information 24 such as lender payment information, purchaser payoff quotes, comparison results, and decisions by any of the loan analysts or system users (including whether they accept any proposed payoff premium quote).

Figure 7:
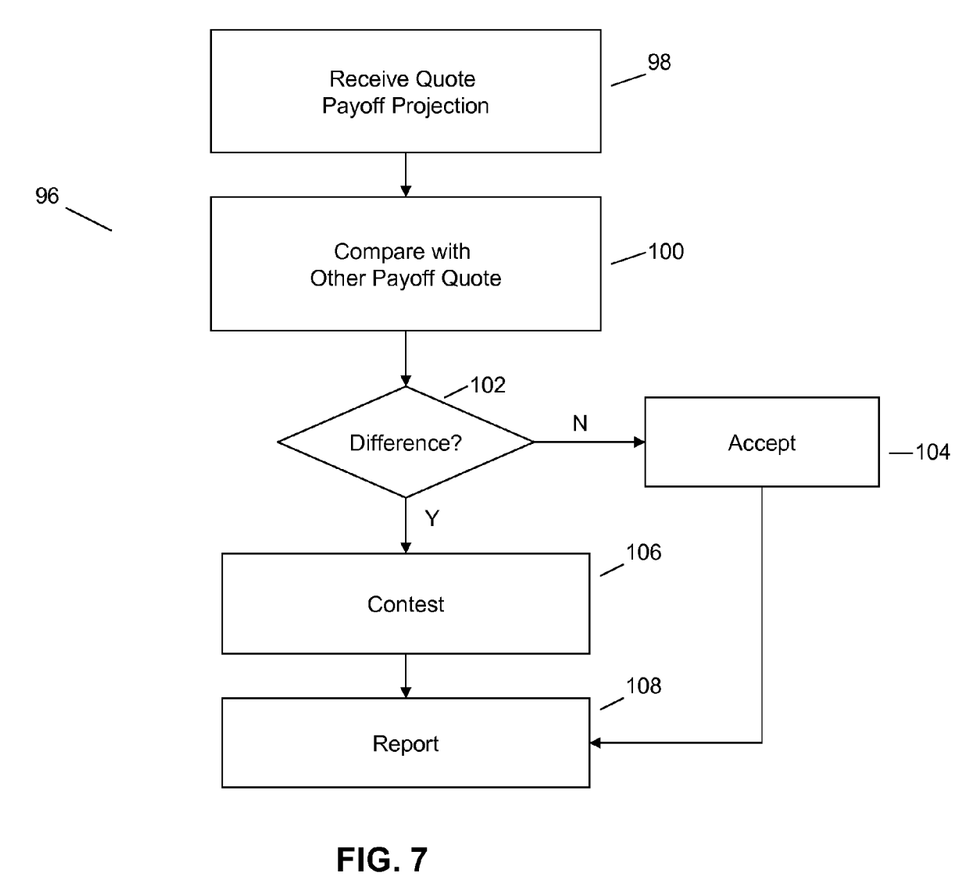
FIG. 7 is a schematic illustration of a rules engine in accordance with an exemplary embodiment.

The following table provides additional examples of other data elements that may be displayed as output from the payoff calculator logic 50:

party for collection of funds according to the quote. The steps may be manually performed or performed by a computer data processing system 16. If the steps are manually performed the system user can communicate decisions and receive quotes through user interface 45.

In one embodiment, the data processing system 16 includes document custodian logic (not shown) which interfaces with the data processing system 16 to retrieve archived documents from a storage facility or warehouse. Upon satisfaction of a loan, the originals of certain documents (e.g., the deed to the property) may be issued to the borrower/home owner. The originals of some documents can be stored in a document storage facility (or retention warehouse). If the loan on the property is satisfied title fully transfers to the borrower. Once payoff quotes are provided and accepted by a system the loan may be paid off in full. After the remaining balance on the loan is received by the lender the storage facility receives instruction to release the original documents. The documents are then sent to the lender in care of the borrower for transfer

| Reference # | Data Element | Applicable Loan Types/ Investment Types | Relationship/Additional Conditions/Notes |
|---|---|---|---|
| 1 | Payoff ID Number | All | Auto-Generated by Payoff Calculator |
| 2 | Service Fee Due Lender | All | Formula derived by Loan Type and Calculated by Payoff Calculator |
| 3 | Interest Due Fannie Mae | Cash | Formula derived from Loan Type and Calculated by Payoff Calculator |
| 4 | Interest Due Investor | MBS | Formula Derived from Loan Type and Calculated by Payoff Calculator |
| 5 | Guarantee Fee Due Fannie Mae | MBS | Formula Derived from Loan Type and Calculated by Payoff Calculator |
| 6 | Per Diem Interest | Cash | Formula Derived from Loan Type and Calculated by Payoff Calculator. Only displayed for interest due up to the Payoff Date. Not displayed for full month payoffs. |
| 7 | Total Declining Premium Amount | All | Formula Derived from Loan Type and Calculated by Payoff Calculator. |
| 8 | Declining Premium Amount Due Fannie Mae | All | Formula Derived from Loan Type and Calculated by Payoff Calculator; or Amount manually keyed. |
| 9 | Declining Premium Amount Due Lender | All | Formula Derived from Loan Type and Calculated by Payoff Calculator; or Amount manually keyed. |
| 10 | Declining Premium Amount Due Investor | MBS | Amount manually keyed. |
| 11 | Total Yield Maintenance Amount | All | Formula Derived from Loan Type and Calculated by Payoff Calculator |
| 12 | Yield Maintenance Amount Due Purchaser | All | Formula Derived from Loan Type and Calculated by Payoff Calculator |
| 13 | Yield Maintenance Amount Due Lender | All | Formula Derived from Loan Type and Calculated by Payoff Calculator |
| 14 | Yield Maintenance Amount Due Investor | MBS | Formula Derived from Loan Type and Calculated by Payoff Calculator |

Referring now to FIG. 7, once users receive a payoff quote they may decide whether to accept the quote or contest it. At step 100, the purchaser payoff quote is received. At step 102, a system user compares the purchaser payoff quote to any other quote. For example, if a loan servicer 14 provides a payoff quote, an investor 20 may compare the purchaser payoff quote 28 with the loan servicer payoff quote. If the system user notices that there is a difference between the two (as shown at step 104), the user has the option of accepting (as shown at step 106) or contesting (as shown at step 108) the purchaser payment quote. Either decision is reported to the data processing system 16 as shown at step 110. If the purchaser payoff quote is accepted by the user the decision is communicated to the purchaser 18 or an independent third to the borrower. Thus, the process of releasing documents is integrated into the data processing system 16, thereby integrating the payoff quoting process, quote acceptance/loan payoff process, and custodial process into a more seamless workflow. In this way, the purchaser 18 may maintain a "clean" inventory of records, automatically releasing documents at the time of loan satisfaction.

A method of reporting loan payoff information includes receiving loan information regarding a loan. The loan information includes loan terms, interest rate, unpaid principal balance, and/or payoff premium information and/or any other parameter. The payoff quotes include a prepayment premium for an early satisfaction of a loan and a total payoff amount for the early satisfaction of the loan. The method also includes reporting payoff quotes via the Internet.

Web pages may display additional information regarding the loans and/or MBS. For example the user interfaces may output the purchaser/servicer name, purchaser/servicer user name, purchaser/servicer loan number, property name, maturity date, interest basis, interest rate, current interest rate, validated current interest rate, rate change frequency, net interest rate, loan number, expected payoff date, yield maintenance end date, unpaid principal balance at payoff, declining premium percentage, miscellaneous fees, payoff state, payoff quote identification number, apportionment of any fees/interest, daily (or "per diem") interest, total declining premium amount, apportionment of declining premium amount, total yield maintenance amount, apportionment of total yield maintenance amount, etc. Data processing system 16 is compatible with printing systems to print out any information outputted by the system 16. Moreover, the graphical and textual representations of the user interfaces are printable.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network 10 or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing environment in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

It should also be apparent that it is also possible to construct data processing systems which do not incorporate the advantages described herein in connection with the data processing system 16, or which also incorporate additional advantages not described herein.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations. Further, although various figures depict a series of steps which are performed sequentially, the steps shown in such figures generally need not be performed in any particular order. For example, some of the steps may be performed essentially simultaneously. Additionally, some steps shown may be performed repetitively with particular ones of the steps being performed more frequently than others. Alternatively, it may be desirable in some situations to perform steps in a different order than shown.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

We claim:

1. A data processing system having a processor coupled to a computer readable storage medium for reporting loan payoff information, comprising:
    payoff calculation logic comprising the processor that is in communication with the computer readable storage medium that stores a program that when executed by the processor causes the processor to accept loan information and generate a payoff quote for a plurality of loans, at least one of the plurality of loans having different prepayment terms than another one of the plurality of loans, the payoff quotes including:
        (i) a prepayment premium for premature satisfaction of a loan, wherein the prepayment premium for the at least one of the plurality of loans is generated using a different algorithm than a prepayment premium algorithm used for the another one of the plurality of loans based on the different prepayment terms;
        (ii) a total payoff amount that includes the prepayment premium for the premature satisfaction of the loan;
    user interface logic configured to communicate the payoff quote via a network; and
    wherein the payoff processor is configured to determine the prepayment premium based on a reason the total payoff amount was requested.

2. The system of claim 1, wherein the loan information is for a loan used to finance or refinance the purchase of housing.

3. The system of claim 1, wherein the loan information is for a loan used to finance or refinance the purchase of a multi-family property.

4. The system of claim 1, wherein the payoff calculation logic generates the payoff quote by accessing one of a plurality of different stored algorithms for calculating different types of prepayment premiums for premature satisfaction of a loan.

5. The system of claim 1, further comprising:
    user interface logic configured to receive the payoff quote, wherein the user interface logic is further configured to receive a decision accepting or contesting the payoff quote;
    wherein the user interface logic is configured to communicate the decision to accept or contest the payoff quote.

6. The system of claim 1, wherein the user interface logic is configured to generate a graphical user interface that displays the payoff quote for the loan.

7. The system of claim 1, wherein the system is configured to generate a plurality of payoff quotes and store the plurality of payoff quotes in a database.

8. The system of claim 7, wherein the system is configured to retrieve stored payoff quotes from the database, and wherein reporting logic is configured to communicated retrieved payoff quotes.

9. A data processing system having a processor coupled to a computer readable storage medium for reporting loan payoff information, comprising: acquisition logic configured to receive loan information regarding a loan, wherein the loan information includes loan terms, interest rate, unpaid principal balance, and/or payoff premium information;
    payoff calculation logic comprising the processor that is in communication with the computer readable storage medium that stores a program that when executed by the processor causes the processor to accept loan information and generate a payoff quote for a plurality of loans, at least one of the plurality of loans having different prepayment terms than another one of the plurality of loans, the payoff quote including:
        (i) a prepayment premium for premature satisfaction of the loan, wherein the prepayment premium for the at least one of the plurality of loans is generated using a different algorithm than a prepayment premium algorithm used for the another one of the plurality of loans based on the different prepayment terms;
        (ii) a total payoff amount for the premature satisfaction of the loan;
    user interface logic configured to communicate the payoff quote via a network; and
    wherein the processor determines the prepayment premium based on a reason the total payoff amount was requested.

10. The system of claim 9, wherein the payoff calculation logic generates the payoff quote by accessing one of a plurality of different stored algorithms for calculating different types of prepayment premiums for premature satisfaction of a loan.

11. The system of claim 10, wherein the payoff calculation logic is configured to reference an algorithm that calculates the prepayment premium for premature satisfaction using a present value factor multiplied by the remaining interest owed over the course of the loan.

12. The system of claim 10, wherein the payoff calculation logic is configured to reference an algorithm that calculates a prepayment premium for premature satisfaction using a premium percentage multiplied by the unpaid principal balance of the loan.

13. The system of claim 9, wherein the premium percentage is configured to decrease over the course of the loan.

14. The system of claim 9, wherein the premium percentage is configured to increase over the course of the loan.

15. The system of claim 9, further comprising:
a rules engine configured to receive the payoff quote, wherein rules engine is further configured to receive a decision accepting or contesting the payoff quote;
wherein the reporting logic is configured to communicate the decision to accept or contest the payoff quote.

16. The system of claim 9, wherein the reporting logic is configured to generate a graphical user interface that displays the payoff quote for the loan.

17. The system of claim 9, further comprising:
document custodian logic configured to interface with a document management system governing the storage of a loan document, wherein the document custodian logic instructs the document management system to the release loan document upon satisfaction of a predetermined condition.

18. The system of claim 17, wherein the predetermined condition is premature satisfaction of the loan.

19. The system of claim 9, wherein the network is an Internet-based communication platform.

20. A data processing system having a processor coupled to a computer readable storage medium configured to generate a graphical user interface for reporting loan payoff information, comprising:
payoff calculation logic comprising the processor that is in communication with the computer readable storage medium that stores a program that when executed by the processor causes the processor to accept loan information and generate a payoff quote for a plurality of loans, at least one of the plurality of loans having different prepayment terms than another one of the plurality of loans, the payoff quotes including:
(i) a prepayment premium for a premature satisfaction of a loan, wherein the prepayment premium for the at least one of the plurality of loans is generated using a different algorithm than a prepayment premium algorithm used for the another one of the plurality of loans based on the different prepayment terms;
(ii) a total payoff amount for the premature satisfaction of the loan;
user interface generation logic configured to display the payoff quote; and
wherein the processor determines the prepayment premium based on a reason the total payoff amount was requested.

* * * * *